(12) United States Patent
Arnold

(10) Patent No.: US 7,513,718 B1
(45) Date of Patent: Apr. 7, 2009

(54) ALIGNMENT DEVICE FOR A HOLE SAW AND METHOD OF ENLARGING A HOLE USING SAME

(76) Inventor: Mark Arnold, 412 Rumson St., Englewood, OH (US) 45322

( * ) Notice: Subject to any disclaimer, the term of this patent is extended or adjusted under 35 U.S.C. 154(b) by 495 days.

(21) Appl. No.: 11/162,481

(22) Filed: Sep. 12, 2005

(51) Int. Cl.
B23B 51/04 (2006.01)

(52) U.S. Cl. .......................... 408/1 R; 408/80; 408/94; 408/204; 408/201

(58) Field of Classification Search ............... 408/79, 408/80, 81, 93, 94, 201, 204, 1 R; 411/389, 411/399; 292/347; 269/229, 234; 254/104
See application file for complete search history.

(56) References Cited

U.S. PATENT DOCUMENTS

| | | | | |
|---|---|---|---|---|
| 981,227 | A * | 1/1911 | Schwartz | 408/82 |
| 1,231,551 | A * | 7/1917 | Alexander | 408/200 |
| 1,341,067 | A * | 5/1920 | Naugle | 408/93 |
| 1,373,856 | A * | 4/1921 | Bosch | 408/82 |
| 2,306,807 | A * | 12/1942 | Hulvey et al. | 408/206 |
| 2,725,766 | A * | 12/1955 | Van Heukelom | 408/81 |
| 2,961,268 | A * | 11/1960 | Russell et al. | 292/352 |
| 3,145,362 | A * | 8/1964 | Kleven | 338/303 |
| 3,339,958 | A * | 9/1967 | Lint | 292/169.21 |
| 3,545,311 | A * | 12/1970 | Messer, Jr. | 82/1.5 |
| 4,579,486 | A | 4/1986 | Damico | 408/204 |
| 4,749,315 | A * | 6/1988 | Mills | 408/209 |
| 4,940,370 | A * | 7/1990 | Gipson | 408/72 R |
| 4,968,189 | A | 11/1990 | Pidgeon | 408/1 |
| 5,143,489 | A * | 9/1992 | Bogner et al. | 408/1 R |
| 5,366,326 | A | 11/1994 | Converse | 408/72 |
| 5,743,682 | A * | 4/1998 | Chaney, Sr. | 408/79 |
| 5,820,315 | A | 10/1998 | Collard | 408/80 |
| 5,871,310 | A | 2/1999 | Mortensen | 408/1 |
| D438,219 | S | 2/2001 | Brutscher | D15/139 |
| 6,305,885 | B1 * | 10/2001 | Linthicum | 408/1 R |
| 6,409,437 | B1 * | 6/2002 | Metzger | 408/80 |
| 7,156,432 | B2 * | 1/2007 | Sledge et al. | 292/358 |

FOREIGN PATENT DOCUMENTS

| | | | |
|---|---|---|---|
| FR | 2864921 A1 * | 7/2005 | |
| JP | 60-263608 A * | 12/1985 | |
| JP | 2001-009619 A * | 1/2001 | |

* cited by examiner

Primary Examiner—Daniel W Howell
(74) Attorney, Agent, or Firm—R. William Graham

(57) ABSTRACT

An alignment device for hole saw includes a first alignment member having a first end having an outer width slightly less than an inner diameter of the hole saw and serves as an alignment bearing surface therefor and a second end configured with a nose to be received adjacent a hole of a work piece and a draw bar and tightening member therewith for drawing the first alignment member against the work piece in a manner wherein the nose is self centering within the hole and thereby maintaining the first alignment member in a predetermined aligned position with respect to the work piece.

8 Claims, 3 Drawing Sheets

ALIGNMENT DEVICE FOR A HOLE SAW AND METHOD OF ENLARGING A HOLE USING SAME

BACKGROUND OF THE INVENTION

1. Field of the Invention

The present invention generally relates to an alignment device for a hole saw and method for guiding hole boring tools and more particularly pertains to an alignment device for a hole saw and method used for enlarging existing holes in a work piece, such as a door.

2. Description of the Prior Art

There exist a number of hole saw guides within the prior art. With respect to the invention, such hole saw guides have been employed for the purpose of enlarging existing holes as is the case where small hole exists in a door, for example, where a lock previously existed and a larger hole is required to install a larger lock in the door. In such case, various hole saw guides have been used.

For example, U.S. Pat. No. 5,366,326 to Converse discloses a hole saw guide for alignment of a hole saw used to enlarge an existing hole. The hole saw guide includes a perforated cylindrical plug fitted to an existing hole. The perforation accepts the hole saw pilot drill member permitting free rotation. The perforated cylindrical plug includes a stop which prevents passage of the plug through the existing hole. The problem with this type of device is that the plug is limited to a particular existing hole size and must be friction fit and requires a hammer to install and remove.

U.S. Pat. No. 5,871,310 to Martensen discloses a device for use in combination with a hole saw of the type including a cylindrical hollow body having a circular lower cutting edge, a top mandrel with a shank in engagement with a chuck of a drill and a pilot bit for guiding the hole saw when cutting a new opening in a work piece having a predrilled opening, in which the center of the new opening lies within the predrilled opening. The device includes a dowel plug having a plurality of holes therethrough, wherein a pilot bit of the hole saw can be positioned in a rotatable manner into one of the holes in the dowel plug on center or off center with the predrilled opening in the work piece. The problem with this type of device is that the plug tends move when operating the hole saw thus not providing an off angled opening for the lock to be disposed therein.

U.S. Pat. No. 4,579,486 to Damico discloses a hole saw guide used to position a hole saw while forming a new hole of larger diameter with or without maintaining concentricity with the existing hole. The Damico invention permits enlargement of an existing hole by employing a plurality of screws and locking nuts or sliding arms to engage the existing hole sidewalls and thereby locating a guide hole for the pilot drill of a larger hole saw. The Damico invention means for assuring concentricity of the enlarged hole with respect to the existing hole includes adjustable arms or screws which engage the sidewalls of the existing hole. Since there is no provision for maintaining an isometric relationship of the independently adjustable arms or screws there cannot be an assurance of concentricity without difficult and tedious readjustment.

The background art has made efforts to attempt to form and enlarge holes using various hole enlargement devices. The prior devices while somewhat useful fail to provide an adequate solution and there remains a need to improve the art. The present invention substantially fulfills this need. The present invention achieves its intended purposes, objects, and advantages through a new, useful and unobvious combination of method steps and elements. The prior patents and commercial techniques do not suggest the present invention as disclosed and claimed herein.

SUMMARY OF THE INVENTION

In view of the foregoing disadvantages inherent in the known types now present in the prior art, the present invention provides an improved hole saw guide construction wherein the same can be utilized for enlarging existing holes. As such, the general purpose of the present invention, which will be described subsequently in greater detail, is to provide a new and improved hole saw guide apparatus and method which has all of the advantages of the prior art hole saw guide methods and none of the disadvantages.

It is an object improve the method of enlarging a hole in a work piece using a hole saw.

It is another object of the present invention to provide a new and improved alignment device for a hole saw.

An further object of is to provide quick setup for an alignment device for enlarging an existing hole using a hole saw.

Another object is to provide an alignment device for hole saw which maintains its position substantially thoughout a hole cutting procedure.

Still another object is to provide an alignment device for a hole saw having low friction bearing surface which reduces frictional wear between parts.

Yet another object is to improve safety in operations involving hole enlargement using a hole saw.

Accordingly, the present invention is directed to an alignment device for a hole saw. The device includes a first alignment member having a first end which has an outer width slightly less than an inner diameter of the hole saw and serves as an alignment bearing surface therefor and a second end configured with a nose to be received adjacent a hole of a work piece. (Optionally, the first alignment member can have a first end which has an outer width less than an inner diameter of the hole saw and an inner opening race in which to guidingly receive a bit of the hole saw.) The device further includes a draw bar member connected to the first alignment member and is of a sufficient length to extend through the work piece hole and has a tightening member connected thereto such that the tightening member can be actuated to tighten the first alignment device against the work piece wherein the nose is self centered within the hole. The first end can be generally cylindrical and the second end can be frustoconical. The draw bar can be threadably connected to the first alignment member and the tightening member. The tightening member can include a second alignment member of a like configuration to the first alignment member having a threaded opening to receive a threaded portion of the draw bar therethrough. Optionally, the bar can be slidably frictionally connected to the alignment member and or tightening member.

A method of enlarging a hole in a work piece using a hole saw is provided. The method includes the steps of employing a first alignment member which has a first end having an outer width slightly less than an inner diameter of the hole saw and serves as an alignment bearing surface therefor and a second end which has a nose configured to be received adjacent a preexisting hole of a work piece, disposing the second end adjacent the hole, employing means for drawing the second end against the work piece in a manner wherein the nose is self centered within the hole and thereby maintaining the first alignment member in a predetermined aligned position with respect to the work piece, and employing the hole saw about the first alignment member in a manner to cut an enlarged hole about the pre-existing hole whereby the first alignment member maintains the hole saw in alignment with respect to the work piece.

The invention is defined by the appended claims with the specific embodiment shown in the attached drawings. There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention may be better understood so that the present contribution to the art can be more fully appreciated. Additional features of the invention will be described hereinafter which form the subject of the claims of the invention. It should be appreciated by those skilled in the art that the conception and the disclosed specific methods and structures may readily be utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Pat. and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding may be had by referring to the summary of the invention and the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
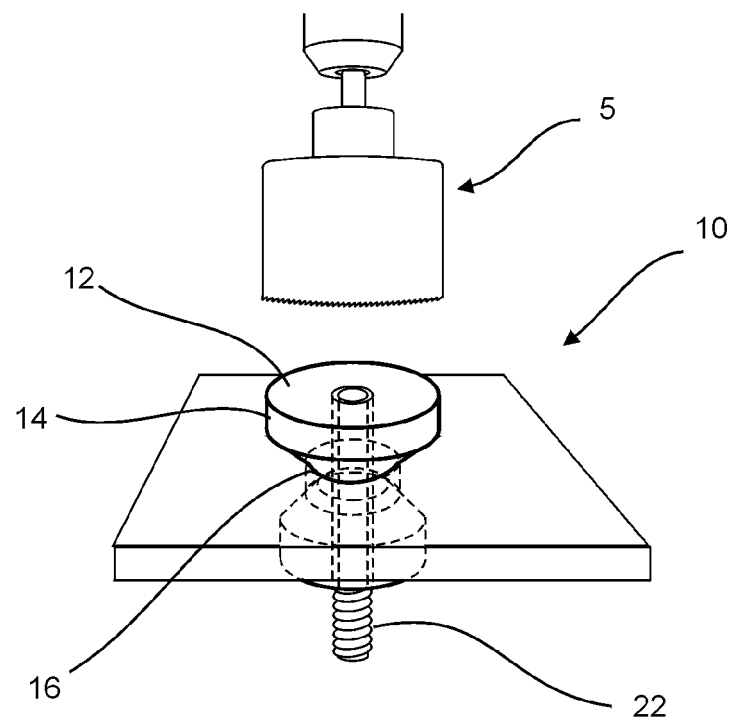
FIG. 1 is a perspective view an embodiment of the alignment device.
Figure 2:
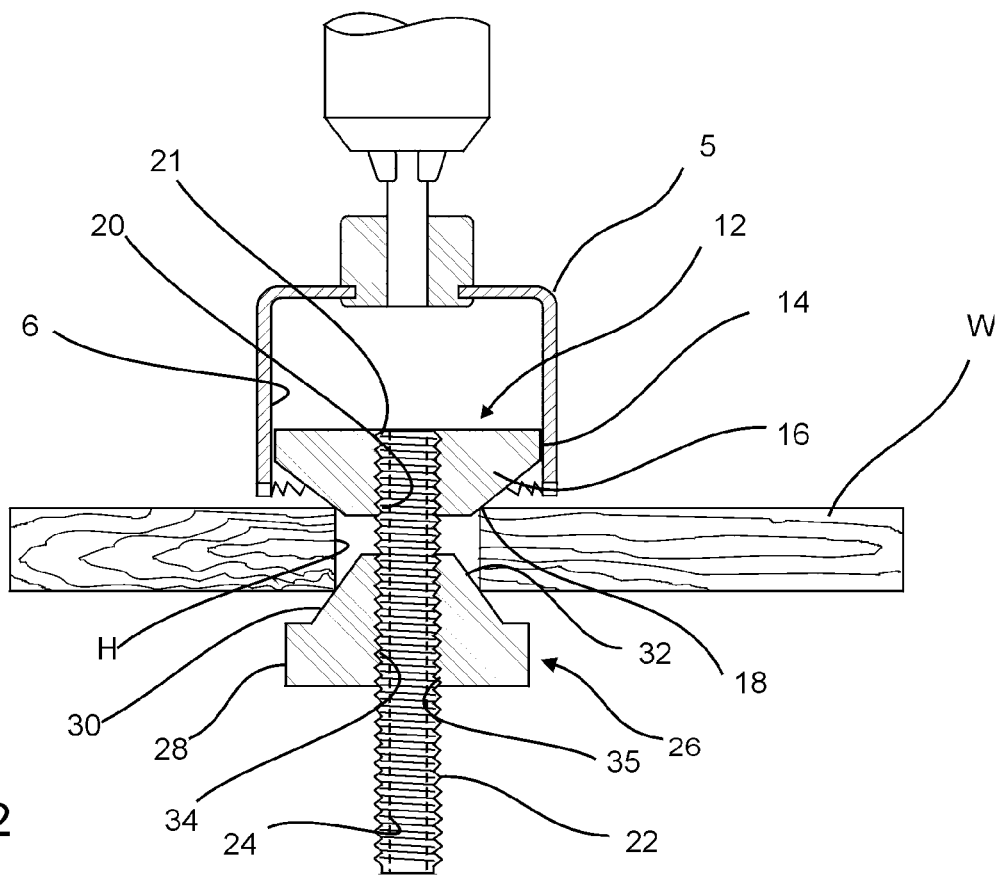
FIG. 2 is a side sectional view of the embodiment of FIG. 1.

Referring now to the drawings, a new and improved alignment device for use with a hole saw 5 is generally designated in a first embodiment by the numeral 10. The device 10 includes a first alignment member 12 which has a first end 14 having an outer diameter slightly less than an inner diameter of the hole saw 5 and a second end 16. The first end 14 can be generally cylindrical and the second end 16 can be frustoconical.

The first end 14 serves as an alignment bearing surface for the inner wall 6 of the saw 5 and the second end 16 is configured with a tapered nose 18 to be received within a preexisting hole H of a work piece W. The alignment member 12 can preferably be configured in shape and of a manner to provide a low friction/wear bearing surface which reduces frictional wear between parts, i.e., teeth of the hole saw 5 against end 14. The member 12 can be made of plastic or wood for example and in some configurations metal may be desirable. The first alignment member 12 can include a central threaded surface 20 defining an opening 21.

A threaded draw bar member 22 is threadably connected to the threaded surface 20 of the first alignment member 12 and is of a sufficient length to extend through the work piece hole H. The bar 22 can have an axial opening 24 therethrough.

A second alignment member 26 serves as a tightening member. The second alignment member 26 can have a first end 28 which has an outer diameter greater than the hole H and a second end 30 which can likewise be frustoconical with at least a portion thereof forming a nose 32 to insert within the hole H. The second alignment member 26 includes a central threaded surface 34 defining an opening 35.

The threaded bar 22 interconnects the alignment members 12 and 26 such that the member 26 can be threaded to draw toward the first alignment device 12 and tighten the same against the work piece W wherein the noses 18 and 32 are self centered within the hole 5. It is recognized that the draw bar 22 can be fixably or otherwise connected to one of the alignment members, e.g., fixable connected to member 12 wherein the other alignment member 26 serves as the other threading/tightening member.

Figure 3:
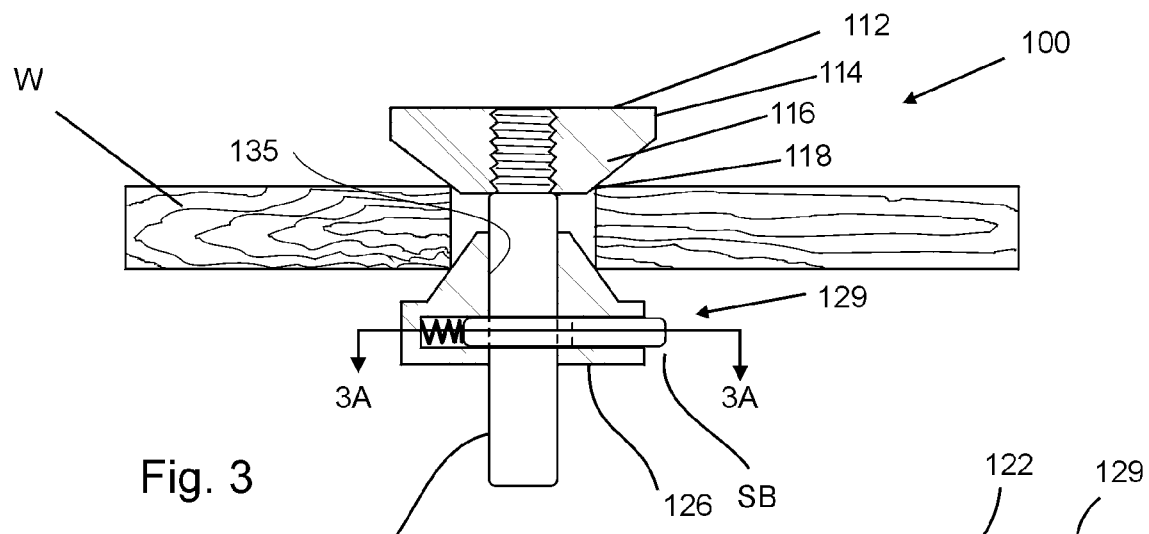
FIG. 3 is a perspective view of an alternate embodiment of the alignment device.
Figure 3A:
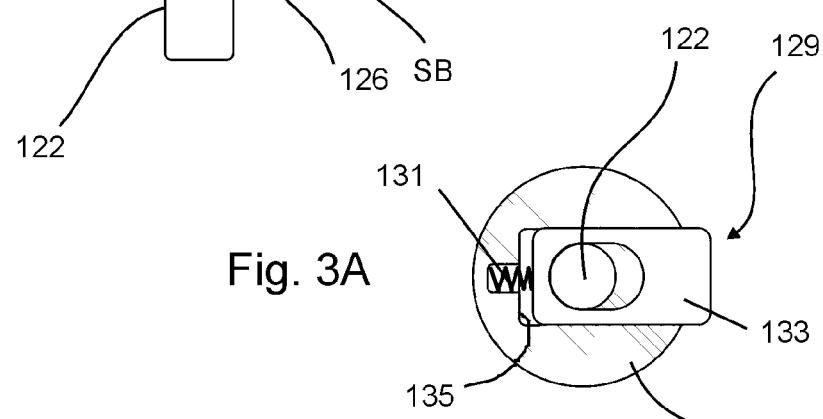
FIG. 3A is a sectional view through line 3A-3A showing a spring brake of a part of the embodiment in FIG. 3.
Figure 4:
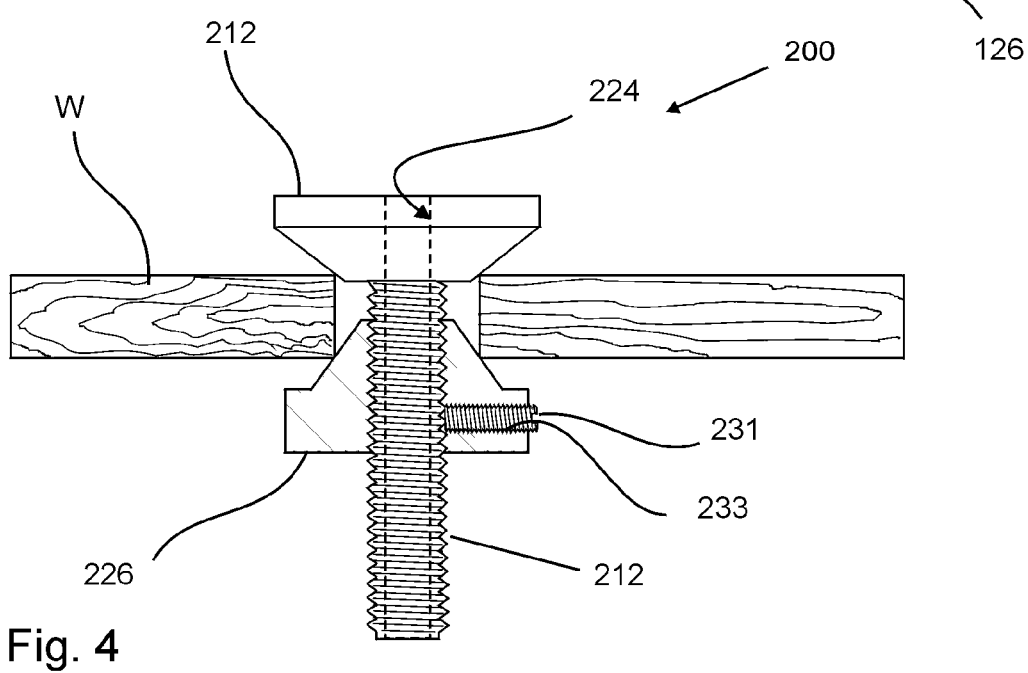
FIG. 4 is a side sectional view of yet another embodiment.

In another embodiment as seen in FIGS. 3-3A, there is shown an alternative device 100. Here, the first alignment member 112 can be similarly formed to the member 12 described above. The bar 122 can be attached at one end to the first alignment member 112. The bar 122 here can be cylindrically shaped and slidably connected to a second alignment member 126. The second alignment member 126 can have a cylindrical surface 135 defining an opening to slidably receive the bar 122. The second alignment member 126 can be made to include a spring brake 129 which retains the second alignment member 126 at various places along the bar 122. The brake 129 includes a spring 131 and brake pad 133 having an oblong opening to receive the bar 122 therethrough and which parts are operably disposed within a slot 135 of the member 126. Otherwise, the second alignment member 126 can be similarly formed. FIG. 4 is a similar embodiment 200 wherein a set screw 231 is threadably disposed within a threaded opening 233 within the member 226 and can be used to set the member 226 in a fixed position along the bar 222. Also, member 212 can include an opening 224 through which a drill bit D can extend in the case us using the bit to align the hole saw 5.

Figure 5:
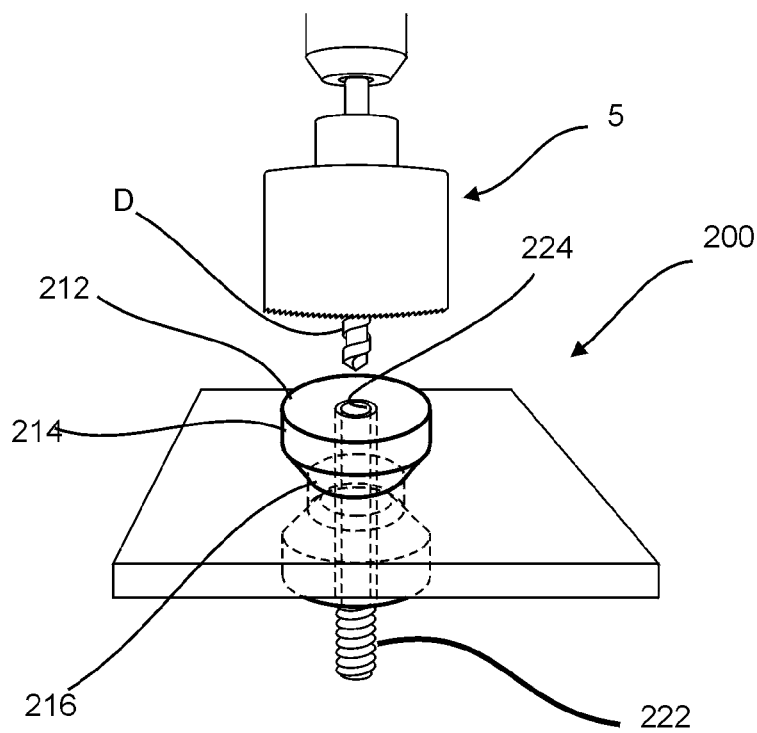
FIG. 5 a perspective view another embodiment of the alignment device.
Figure 6:
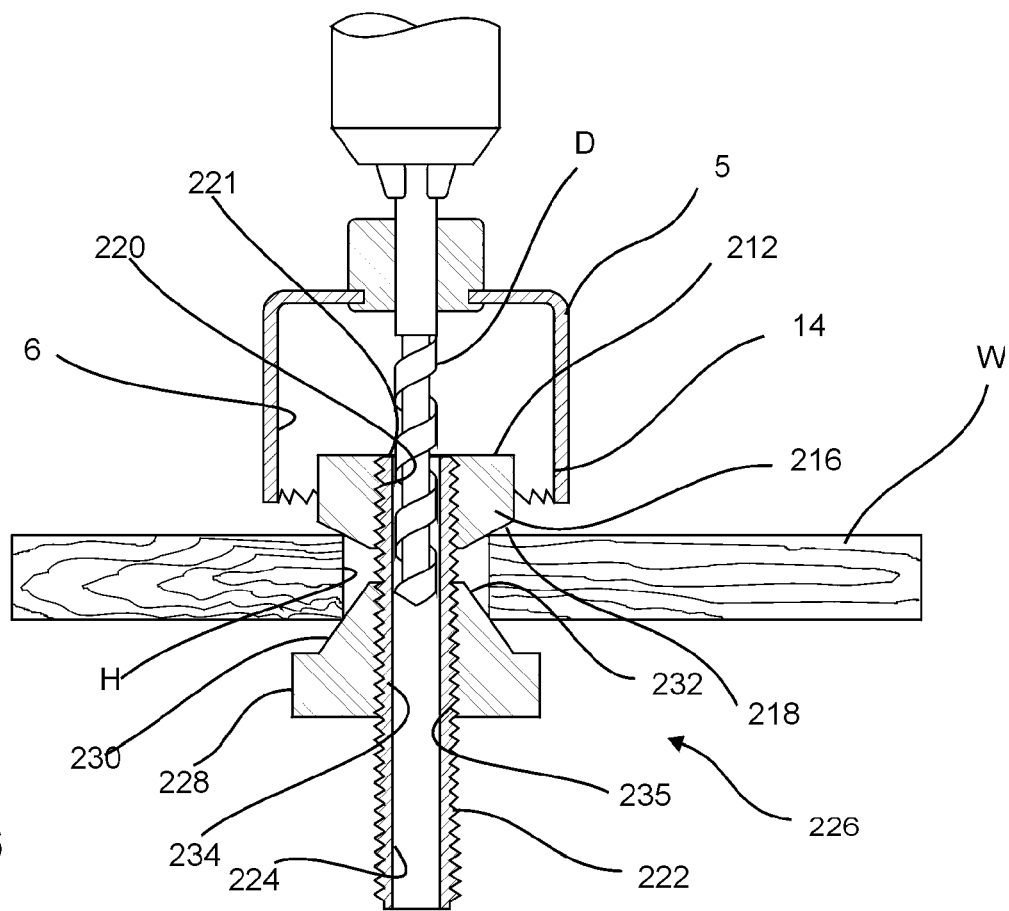
FIG. 6 is a side sectional view of the embodiment of FIG. 5.

This is illustrated in FIGS. 5 and 6 wherein embodiment 200 contemplates the use of a first alignment member 212 which can be similarly formed to the member 12 described above with the exception that a first end 214 need only have an outer diameter less than an inner diameter of the hole saw 5 and larger than the hole H and a second end 216 can be similar configured to end 16. Further, a draw bar member 222 can is connected to a surface 220 of the first alignment member 212 and is of a sufficient length to extend through the work piece hole H. The bar 222 can have an axial opening 24 therethrough which is of a diameter larger than the diameter of a drill bit B and can serve as a guide for the hole saw 5. The bar 222 can be attached at one end to the first alignment member 212 and connected to second alignment member 226 in one of the ways described herein. It is recognized the second alignment member 226 could also be configured in a similar manner to member 26 or 126.

A method of enlarging a hole in a work piece using a hole saw is also provided. The method includes the steps of employing the first alignment member 12 (or 122) having a first end 14 (or 114) having an outer width slightly less than an inner diameter of the hole saw 5 and serves as an alignment bearing surface therefore and a second end 16 (or 116) configured with a nose 18 (or 118) configured to be received adjacent a preexisting hole H of a work piece W. A second step includes disposing the second end 16 adjacent the hole H and then employing means 22 and 26 (or 122 and 126) for drawing the second end 16 against the work piece W in a manner wherein the nose 18 (or 118) is self centered within the hole H and thereby maintaining the second end 16 (or 116) in a predetermined aligned position with respect to the work piece W. Finally, the method includes the step of employing the hole saw 5 about the first alignment member 12 (or 112) in a manner to cut an enlarged hole about the pre-existing hole H whereby the first alignment member 12 (or 112) maintains the hole saw 5 in alignment with respect to the work piece W, i.e., the saw 5 is normal to the horizontal surface of the work piece W.

The above described embodiments are set forth by way of example and are not for the purpose of limiting the present invention. It will be readily apparent to those skilled in the art that obvious modifications, derivations and variations can be made to the embodiment without departing from the scope of the invention. For example, the particular shape of the alignment members shown enables the invention, but it is contemplated that other shapes can be employed to accomplish the invention. The alignment member and bar can be molded or otherwise formed from plastic, metal or other materials can be employed. Accordingly, the claims appended hereto should be read in their full scope including any such modifications, derivations and variations.

What is claimed is:

1. An alignment device for hole saw, which includes:
    a first cone shaped alignment member which has a first end having an outer width less than an inner diameter of the hole saw and having an outer width greater than an inner diameter of the surface defining a hole of the work piece and has an inner surface defining an opening to receive a bit of the saw therethrough to enable alignment bearing surface therefor and a second tapered end at least a portion of which is less diameter than said surface defining the hole of the work piece to be received adjacent thereto and a second cone shaped alignment member having a first end having an outer width greater than the inner diameter of the surface defining the hole of the work piece and a second end at least a portion of which is less than the inner diameter of the surface defining the hole of the work piece to be received adjacent thereto; and
    means for bringing together said first alignment member and said second alignment member against the work piece in a manner wherein as said second ends are brought together and contact the surface defining the hole of the work piece said first end of said first alignment member is caused to be centered within the hole and thereby maintaining said first alignment member in a predetermined aligned position with respect to the work piece.

2. The alignment device of claim 1, wherein said means for bringing together includes a draw bar connected to said first alignment member and said second member and is of a sufficient length to extend through the work piece hole and further having means for tightening said alignment members against said work piece.

3. The alignment device of claim 1, wherein said inner surface is generally cylindrical.

4. The alignment device of claim 1, wherein said second ends are conical.

5. The alignment device of claim 2, wherein said draw bar is threadably connected to one of said first alignment member and said second alignment member.

6. The alignment device of claim 2, wherein said draw bar is threadably connected to said means for tightening.

7. The alignment device of claim 2, wherein said draw bar is connected to said means for tightening.

8. A method of enlarging a hole in a work piece using a hole saw, which includes the steps of (a) employing a first alignment member having a first end having an outer width slightly less than an inner diameter of the hole saw and having an outer width greater than an inner diameter of a preexisting inner surface defining a hole of the work piece which serves as an alignment bearing surface for said hole saw and a second tapered end at least a portion of which is less diameter than said surface defining the hole to be received adjacent the, and a second alignment member having a first end having an outer width greater than the inner diameter of the preexisting inner surface and a second tapered end at least a portion of which is less than the inner diameter of the preexisting inner surface to be received adjacent thereto preexisting inner surface, (b)

disposing the second ends from opposite sides of the work piece adjacent the preexisting inner surface in opposing facing relation, (c) employing means for bringing together said first alignment member and said second alignment member against the work piece in a manner wherein as said second tapered ends are brought together and contact the surface defining the hole of the work piece said first end of said first alignment member caused to be centered within the hole, and (d) employing the hole saw about the first alignment member in a manner to cut an enlarged hole about the preexisting inner surface whereby the first alignment member maintains the hole saw in alignment with respect to the work piece.

* * * * *